United States Patent
Liu et al.

(10) Patent No.: US 11,182,612 B2
(45) Date of Patent: Nov. 23, 2021

(54) SYSTEMS AND METHODS FOR PLACE RECOGNITION BASED ON 3D POINT CLOUD

(71) Applicant: The Chinese University of Hong Kong, Hong Kong (CN)

(72) Inventors: Yunhui Liu, Hong Kong (CN); Shunbo Zhou, Shenzhen (CN); Zhe Liu, Shanxi (CN); Hongchao Zhao, Jiangyin (CN); Wen Chen, Jingzhou (CN); Chuanzhe Suo, Jinan (CN)

(73) Assignee: The Chinese University of Hong Kong, Hong Kong (CN)

( * ) Notice: Subject to any disclaimer, the term of this patent is extended or adjusted under 35 U.S.C. 154(b) by 31 days.

(21) Appl. No.: 16/665,814

(22) Filed: Oct. 28, 2019

(65) Prior Publication Data
US 2021/0124901 A1    Apr. 29, 2021

(51) Int. Cl.
*G06K 9/00*    (2006.01)
*G06T 7/73*    (2017.01)

(52) U.S. Cl.
CPC .............. *G06K 9/0063* (2013.01); *G06T 7/74* (2017.01); *G06T 2207/10028* (2013.01); *G06T 2207/20016* (2013.01); *G06T 2207/20081* (2013.01); *G06T 2207/20084* (2013.01)

(58) Field of Classification Search
CPC .................... G06K 9/0063; G06T 7/74; G06T 2207/20081; G06T 2207/20084; G06T 2207/20016; G06T 2207/10028
See application file for complete search history.

(56) References Cited

U.S. PATENT DOCUMENTS

| 10,939,129 B2* | 3/2021 | Mammou | H04N 19/174 |
| 11,049,267 B2* | 6/2021 | Selviah | G06K 9/6203 |
| 2014/0350839 A1* | 11/2014 | Pack | G05D 1/0214 |
| | | | 701/409 |
| 2017/0220887 A1* | 8/2017 | Fathi | G06K 9/00208 |
| 2019/0311499 A1* | 10/2019 | Mammou | G06T 9/001 |

FOREIGN PATENT DOCUMENTS

KR    101579634 B1 *  1/2016  .............. G06F 7/08

OTHER PUBLICATIONS

Translated KR101579634 Copy (Year: 2016).*
Liu et al., "3D Point Cloud Learning for Large-scale Environment Analysis and Place Recognition," Dec. 11, 2018, arXiv: 1812.07050.
Liu et al., "Loop-Closure Detection Based on 3D Point Cloud Learning for Self-Driving Industry Vehicles," Apr. 30, 2019, arXiv: 1904.13030.

* cited by examiner

*Primary Examiner* — Nancy Bitar
(74) *Attorney, Agent, or Firm* — Fish & Richardson P.C.

(57) ABSTRACT

Various aspects of a systems and method for place recognition based on a 3D point cloud are disclosed herein. A computer-implemented method for place recognition based on a 3D point cloud, comprising: capturing a 3D point cloud of an area in which the mobile agent is traveling; extracting local features of each point in the captured 3D point cloud; generating a global descriptor of each point of the 3D point cloud using a deep neural network, based on the extracted local features; constructing a place descriptor map of the area based on the generated global descriptors; and recognizing the area by using the generated place descriptor map.

19 Claims, 16 Drawing Sheets

SYSTEMS AND METHODS FOR PLACE RECOGNITION BASED ON 3D POINT CLOUD

TECHNICAL FIELD

The present disclosure generally relates to the field of environmental perception, more particularly, to systems and methods for place recognition based on the three-dimensional (3D) point cloud.

BACKGROUND

Autonomous navigation is paramount significance in the robotic community such as helping self-driving vehicles and unmanned aerial vehicles achieve full autonomy. Place recognition, in particular, represents one of the crucial challenges of accurate navigation.

Traditional solutions for place recognition mainly fall into two categories, image-based and 3D point cloud-based. The image-based solutions are unreliable due to its non-robustness under different lighting, season, and weather conditions, and under different viewpoints. 3D point cloud-based solutions, on the other hand, does not suffer from changes in external illumination. However, compared to feature extraction algorithms for visual images, there is no similar approach designed for point clouds that can reach the same level of maturity. In addition, point cloud related operation is usually computationally expensive so that real-time performance cannot be guaranteed. Hence, effective feature extraction and retrieval of the point cloud are two fundamental issues that the existing 3D point cloud-based place recognition methods have been trying to overcome.

Additionally, traditional point cloud-based retrieval for place recognition usually rely on a global, off-line, and high-resolution map, and can achieve centimeter-level localization, but at the cost of time-consuming off-line map registration and data storage requirements. The current methods fail to consider local feature extraction adequately, and the spatial distribution information of local features have also not been considered, which makes it difficult to generalize the learned features. Efficient point cloud retrieval is another issue to be solved for real-time and large-scale place recognition.

Accordingly, what is needed are systems and methods for place recognition base on the 3D point cloud to effectively tackle the above challenges and resolve the feature extraction and point cloud retrieval problems.

SUMMARY

Aspects of the disclosure are to address at least the above-mentioned problems and/or disadvantages and to provide at least the advantages described below. Accordingly, an aspect of the disclosure is to provide a method for place recognition, by which the discriminability and universality of the obtained global features can be superior to those from the existing point cloud feature extraction methods. In addition, a sequence-based coarse-to-fine matching strategy is proposed to enhance the point cloud retrieval efficiency, which achieves accurate place recognition within a feasible online searching time.

According to the present disclosure, a computer-implemented method for place recognition based on a 3D point cloud is provided. The method may comprise: capturing a 3D point cloud of an area in which the mobile agent is traveling; extracting local features of each point in the captured 3D point cloud; generating a global descriptor of each point of the 3D point cloud using a deep neural network, based on the extracted local features; constructing a place descriptor map of the area based on the generated global descriptors; and recognizing the area by using the generated place descriptor map.

According to another aspect of the present disclosure, a system for place recognition based on a 3D point cloud is provided. The system may comprise: a processor; and a memory coupled to the processor to store instructions, which when executed by the processor, cause the processor to perform operations including: capturing a 3D point cloud of an area in which the mobile agent is traveling; extracting local features of each point in the captured 3D point cloud; generating a global descriptor of each point of the 3D point cloud using a deep neural network, based on the extracted local features; constructing a place descriptor map of the area based on the generated global descriptors; and recognizing the area by using the generated place descriptor map.

According to another aspect of the present disclosure, provided is a non-transitory machine-readable medium having instructions stored therein, which when executed by a processor, cause the processor to perform operations comprising capturing a 3D point cloud of an area in which the mobile agent is traveling; extracting local features of each point in the captured 3D point cloud; generating a global descriptor of each point of the 3D point cloud using a deep neural network, based on the extracted local features; constructing a place descriptor map of the area based on the generated global descriptors; and recognizing the area by using the generated place descriptor map.

BRIEF DESCRIPTION OF THE DRAWING

Exemplary non-limiting embodiments of the present disclosure are described below with reference to the attached drawings. The drawings are illustrative and generally not to an exact scale. Like reference numerals refer to like parts throughout the various views unless otherwise specified.

DETAILED DESCRIPTION

In order to make the objects, the technical solutions and the advantages of the present disclosure clear and complete, the present disclosure will be described hereinafter in a clear and complete manner in conjunction with the drawings and embodiments. Evidently, the following embodiments merely relate to a part of, rather than all of, the embodiments of the present disclosure, and based on these embodiments, a person skilled in the art may, without any creative effort, obtain other embodiments, which also fall within the scope of the present disclosure.

Figure 1:
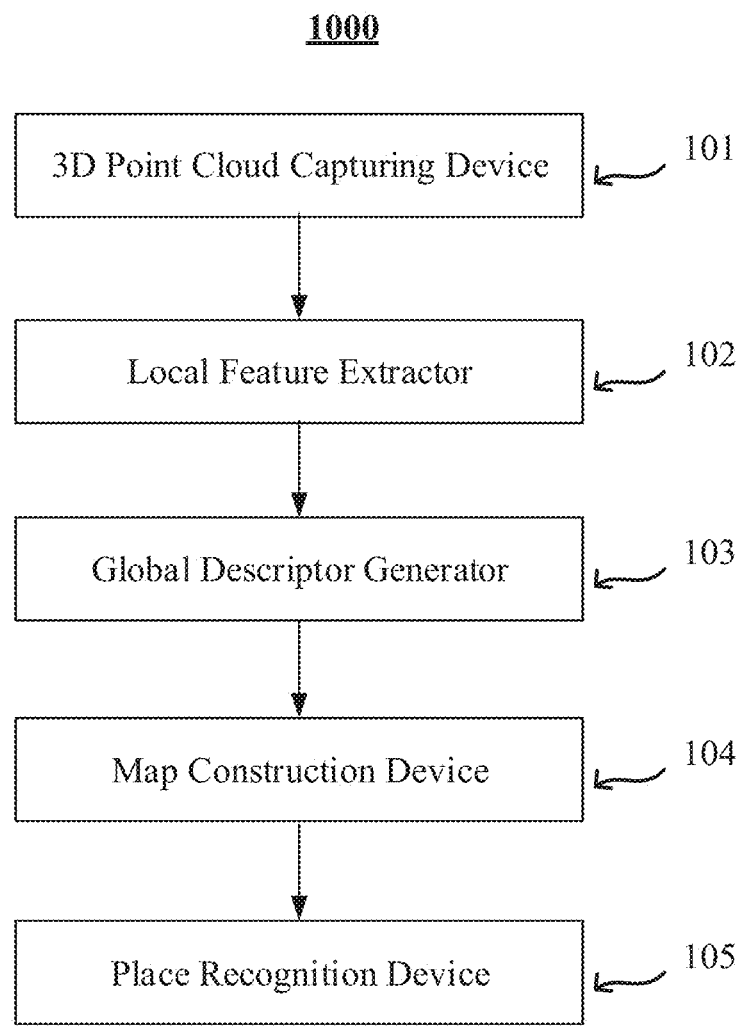
FIG. 1 is a schematic block view illustrating a system for place recognition according to an embodiment of the present disclosure.

FIG. 1 is a schematic block view illustrating a system 1000 for place recognition according to an embodiment of the present disclosure. In an embodiment, the system may be implemented by a mobile agent, which may include, but not limited to UAV (unmanned aerial vehicles), AGV (autonomous ground vehicles), helicopters, airplanes, cars, trucks, buses, boats, farm vehicles, construction vehicles, military vehicles, motorcycles or golf carts.

As shown in FIG. 1, the system 1000 for place recognition based on 3D point cloud may include a 3D point cloud capturing device 101, a local feature extractor 102, a global descriptor generator 103, a map retrieving device 104 and a place recognition device 105.

The 3D point cloud capturing device 101 may capture a sequence of point clouds from an area in which the mobile agent is traveling. The 3D point cloud may include a set of points in a 3D Cartesian coordinates system. These points may be defined by X, Y, and Z coordinates, and may represent the external surfaces of objects around them. The 3D point cloud capturing device may be any 3D scanners or a LiDAR (light detection and ranging) sensor.

For example, the device can be installed as part of a self-driving vehicle, and the received point cloud can be point cloud of the environment in which the vehicle is traveling captured by an integrated 3D scanner onboard the vehicle. The device can receive a point cloud uploaded by a user desiring to classify a particular location from the pre-stored point cloud sets. The system can also receive the point cloud as part of a point cloud manipulation tool for identifying 3D objects for performing various kinds of automatic manipulations.

The local feature extractor 102 may extract local features of each point in the captured 3D point cloud. The feature extraction may be improved by attempting to calculate local features for capturing the distribution characteristics of each point. Instead of only considering the position of each isolated point, the adaptively selected k nearest neighboring points are also considered to describe the local 3D structure around each point. As above, in one embodiment, ten local features from four types are employed for local feature extraction, which will be described in detail later.

The global descriptor generator 103 may generate a global descriptor of each point of the 3D point cloud using a deep neural network, based on the raw point cloud data and the local features extracted by the local feature extractor.

The global descriptor can uniquely describe the 3D point cloud. Using the global descriptor, the computational and storage complexity will be greatly reduced, thus facilitating the real-time place recognition applications. In an embodiment, the deep neural network may be trained by the raw point cloud (the 3D Cartesian coordinates of each point), the local features of each point and the neighborhood feature descriptors of a plurality of nearest neighboring points around the point. In an embodiment, the deep neural network may include a back propagation training engine configured for point cloud feature learning, and a forward feature extraction engine for point cloud feature extraction.

In an embodiment, the global descriptor generator 103 may extract neighborhood feature descriptors of a plurality of nearest neighboring points around each point; and aggregate the neighborhood feature descriptors to generate the global descriptor. The neighborhood size of each feature point is adaptively selected to optimize the versatility of the network, thereby preventing assumptions on the scene from weakening feature learning.

In the system 1000, the map construction device 104 may construct a place descriptor map of the area based on the generated global descriptors. The place recognition device 105 may recognize the area by using the generated place descriptor map.

The map construction device 104 may be further configured to construct the place descriptor map of the area by using the global descriptors and the corresponding position information. In an embodiment, when the mobile agent is traveling in a work area, all the extracted point cloud global descriptors will be stored with corresponding position information for constructing the place descriptor map. Then the feature space distribution characteristics of these global descriptors are investigated to generate several descriptor clusters. In each cluster, the global descriptor with the nearest L2 distance to the cluster center is selected as the super keyframe and other global descriptors in this cluster are restored in a descriptor index which corresponds to this super keyframe. The selected super keyframes contain all types of characteristic places in the whole environment and each type of them has at least one super keyframe. It should be noted that the place descriptor map is dynamically updated. When a new input point cloud is obtained, the global descriptor of the new input cloud can be retrieved with those in the descriptor map to detect that whether the new scene corresponds to a previously identified place, if so, this means that the trajectory has a loop closure and the previously stored descriptor can be updated by considering the current place recognition result, if not, the new descriptor can be stored into the descriptor map as a new scene, and super keyframes are then updated by repeating the previous steps. In another embodiment, the components of the map construction device can be implemented as computer programs installed on one or more computers in one or more locations that are coupled to each other through a network.

As shown in FIG. 1, the place recognition device 105 of the system 1000 may perform a retrieval operation for the new captured point cloud. In an embodiment, the place recognition device 105 may perform a coarse matching step for the new captured point cloud and the pre-stored point cloud set of the traveling site to acquire a set of matching candidates. The place recognition device 105 may further perform a fine matching for the acquired set of matching candidates to acquire the accurate location of the input point cloud. In another embodiment, the components of the place recognition device can be implemented as computer programs installed on one or more computers in one or more locations that are coupled to each other through a network.

In an embodiment, in the coarse matching stage, the global descriptor of the new input point cloud is compared with the descriptors of all super keyframes firstly to find out the matched cluster. Then in the fine matching stage, local sequence matching strategy is utilized around each place by using the corresponding global descriptor index in the matched cluster to find out the accurate location of the input point cloud, thus achieving the place recognition task.

According to the present disclosure, a novel 3D point cloud place recognition system described above is presented by using deep neural network learning and a coarse-to-fine matching technique. Firstly, the original 3D point cloud data that from the large-scale scenes and corresponding local features are used as input directly, and a newly designed deep neural network is employed to learn and extract the global descriptor to be stored in a descriptor set. Then, when a new input point cloud is obtained, the global descriptor of the new input cloud can be matched with those in the descriptor set to detect that whether the new scene corresponds to a previously identified place, if so, this means that the trajectory has a loop closure and the previously stored descriptor can be updated by considering the current information, if not, the new descriptor can be stored into the descriptor set as a new scene. The feature learning strategy directly from the raw 3D point cloud simplifies the operations because the global descriptor of the point cloud can be obtained in an end-to-end manner. Based on the learned global descriptor, the coarse-to-fine matching configuration also enhances retrieval efficiency, which achieves accurate place recognition within a feasible online searching time.

According to the embodiments of the disclosure, the newly proposed deep neural network-based method for feature learning and extracting leads to the discriminability and universality of the obtained global descriptors being superior to those from the existing point cloud feature extraction methods.

It should be noted that the system 1000 may include one or more components in addition to or instead of those shown. For example, the system 1000 may employ a 3D point cloud learning device with different point cloud feature learning or extraction strategy, in one example, handcrafted point cloud features may be adopted. Other additional components are possible as well.

Figure 2:
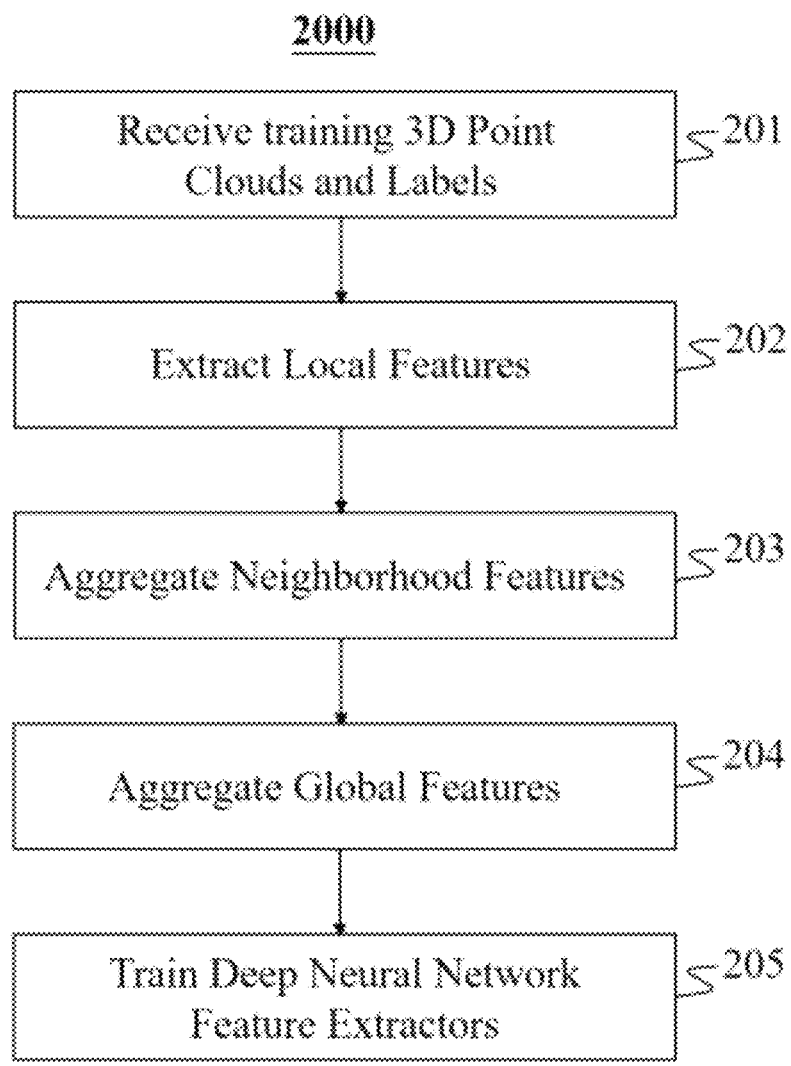
FIG. 2 is a flow chart of an exemplary process for training a deep neural network for the feature learning from the 3D point cloud according to an embodiment of the present disclosure.

FIG. 2 is a flow chart of an exemplary method 2000 for training a deep neural network for the feature learning from a 3D point cloud, according to an embodiment of the present disclosure. The method can be implemented by one or more computer programs installed on one or more computers.

For the deep neural network design, by first introducing the local features in an adaptive manner as the deep neural network input instead of only considering position information of each isolated point, the local features can be adequately learned compared with current methods. Further, by utilizing a graph-based aggregation module in both Feature space and Cartesian space to reveal the neighborhood relations and inductively learn the local structures of points, it can help to reveal the feature distribution and statistics to effectively learn global descriptors for large-scale complex environments.

Although the method 2000 for training the deep neural network is shown for illustrative purposes, the techniques described herein are not limited as such.

In the method 2000, training point clouds and the corresponding labels are received at step S201. Each training point cloud will also include label information to get positive and negative examples for training. In an embodiment, with reference to the Oxford RoboCar dataset, the label information may be obtained by removing inconsistent data from the scene and defining structurally similar point clouds to be at most 10 m apart and those structurally dissimilar to be at least 50 m apart.

At step S202, local features may be extracted from the original 3D point clouds. The extracted point cloud local features may be used as inputs to the deep neural network. Local features usually represent the generalized information in the local neighborhood of each point, and it has been successfully applied to different scene interpretation applications. Existing point cloud learning techniques only consider the original point coordinates X, Y, and Z as network input, local structures and distributions have not been taken into account. This limits the feature learning ability. In contrast, the local features are considered to capture the distribution characteristics of each point in the present disclosure.

In an embodiment, k nearest neighboring points are considered to describe the local 3D structure around each point, and the four types of local features are employed for local feature extraction: eigenvalue-based 3D features, features arising from the projection of the 3D point onto the horizontal plane (Projecting 2D features), normal vector-based features, and features based on Z-axis statistics. In an embodiment, ten local features are selected from the above four types for local feature extraction. They are defined as follows:

| | |
|---|---|
| Eigenvalue-based 3D features | Change of curvature $C_i = \dfrac{\lambda_3^i}{\sum_{j=1}^{3} \lambda_j^i}$ |
| Eigenvalue-based 3D features | Omni-variance $O_i = \dfrac{\sqrt[3]{\prod_{j=1}^{3} \lambda_j^i}}{\sum_{j=1}^{3} \lambda_j^i}$ |
| Eigenvalue-based 3D features | Linearity $L_i = \dfrac{\lambda_1^i - \lambda_2^i}{\lambda_1^i}$ |
| Eigenvalue-based 3D features | Eigenvalue-entropy $A_i = -\Sigma_{j=1}^{3}(\lambda_j^i \ln \lambda_j^i)$ |
| Eigenvalue-based 3D features | Local point density $D_i = \dfrac{k_{opt}^i}{\frac{4}{3}\prod_{j=1}^{3} \lambda_j^i}$ |
| Projecting 2D features | Scattering $S_{i,2D} = \lambda_{2D,1}^i + \lambda_{2D,2}^i$ |
| Projecting 2D features | Linearity $L_{i,2D} = \dfrac{\lambda_{2D,2}^i}{\lambda_{2D,1}^i}$ |
| Normal vector-based features | Vertical component of normal vector $V_i$ |

-continued

| Features based on Z-axis statistics | Maximum height difference $\Delta Z_{i,max}$ |
| --- | --- |
| Features based on Z-axis statistics | Height variance $\sigma Z_{i,var}$ |

For every point in a point cloud, $\lambda_1^i, \lambda_2^i, \lambda_3^i$ represent the eigenvalues of the 3D symmetric positive-definite covariance matrix (also known as 3D structure tensor), and $\lambda_{2D,1}^i$, $\lambda_{2D,2}^i$ represent the eigenvalues of the corresponding 2D covariance matrix.

It should be noted that the input point cloud is typically captured from different scenes, hence an optimal neighborhood size selection is desired. To this end, an adaptive neighborhood structure is designed to select the appropriate neighborhood size according to different situations to fuse the neighborhood information of points. In one embodiment, the optimal neighbor size k is adaptively chosen by minimizing $E_i$ across different k values $$E_i = -L_i ln L_i - P_i ln P_i - S_i ln S_i$$

where $E_i$ is a measure of unpredictability of the local structure from the aspect of the Shannon information entropy theory, $$P_i = \frac{\lambda_2^i - \lambda_3^i}{\lambda_1^i} \text{ and } S_i = \frac{\lambda_3^i}{\lambda_1^i}$$

represent the planarity and scattering features of the local neighborhood of each point, respectively.

Figure 3:
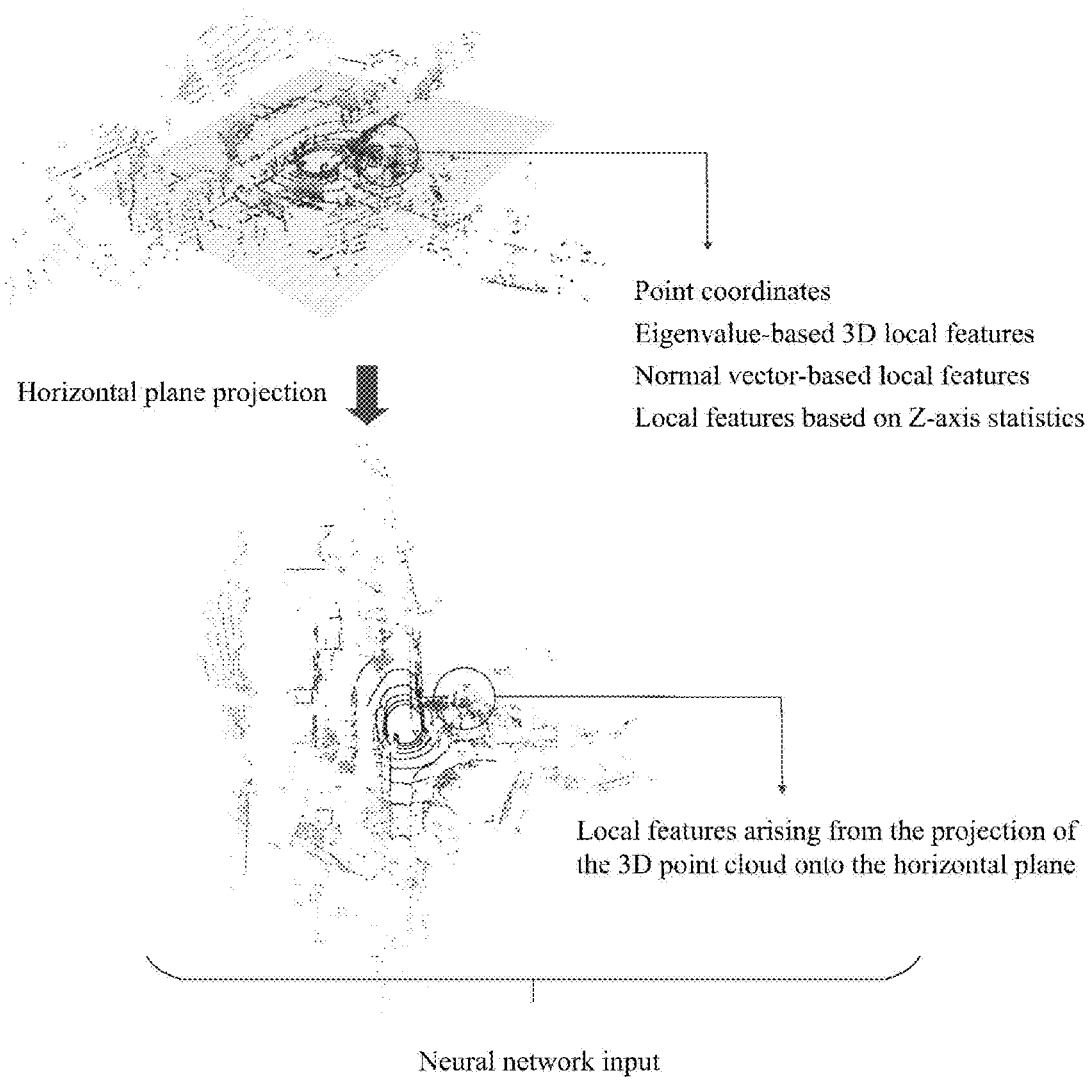
FIG. 3 illustrates an example of the local feature extraction of the 3D point cloud, according to an embodiment of the present disclosure.

FIG. 3 illustrates an example of the local feature extraction of the 3D point cloud, according to an embodiment of the present disclosure. It should be noted that, in addition to the above ten local features, the original coordinates of each point may also be considered as the network input. In order to unify the viewpoint, the coordinates of each point may be transformed to ensure the rotational translation invariance. Then the transformed coordinates and the above ten local features of each point are concatenated and used as the input of the deep neural network.

With the output of the above local feature at step S202, each point can be regarded as the feature description of the surrounding neighborhood since the neighborhood structure has been merged into the feature vector of the neighborhood center point. In order to improve the extraction of local features of point clouds, the system can use a different kind of network structures to further reveal the relations between the points, as shown in FIGS. 4a to 4c.

Figure 4A:
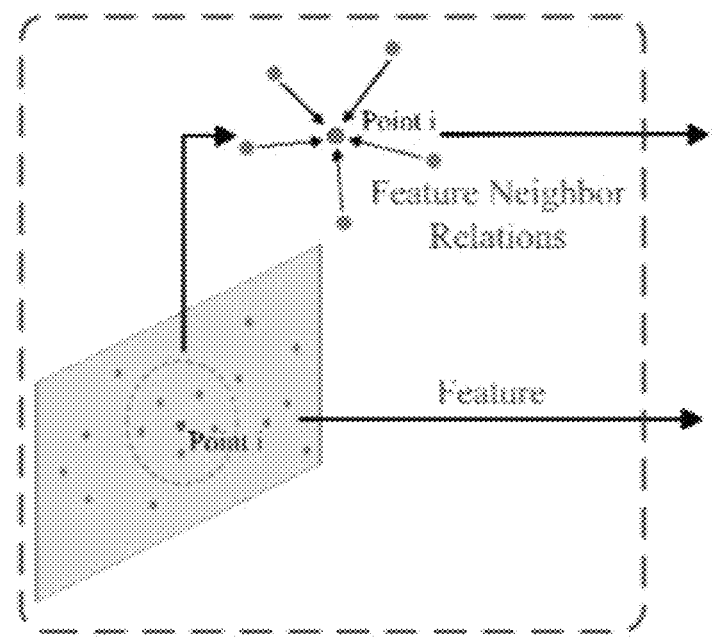
FIGS. 4a to 4c illustrate exemplary network structures employed for local feature and relation extraction according to an embodiment of the present disclosure.
Figure 4B:
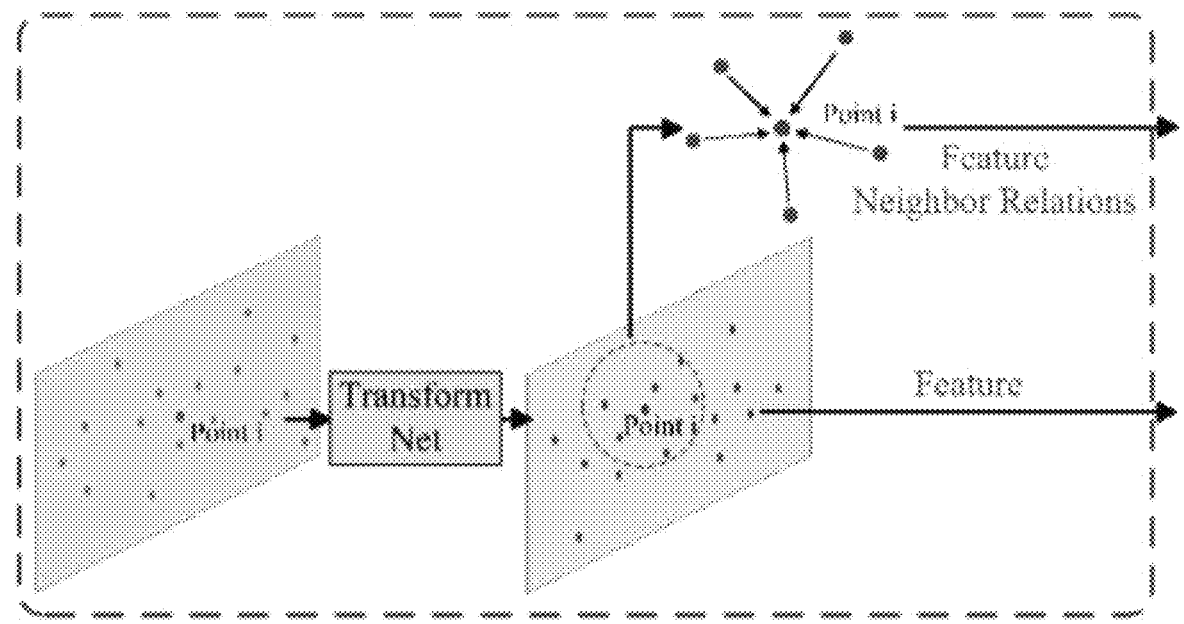
Figure 4C:
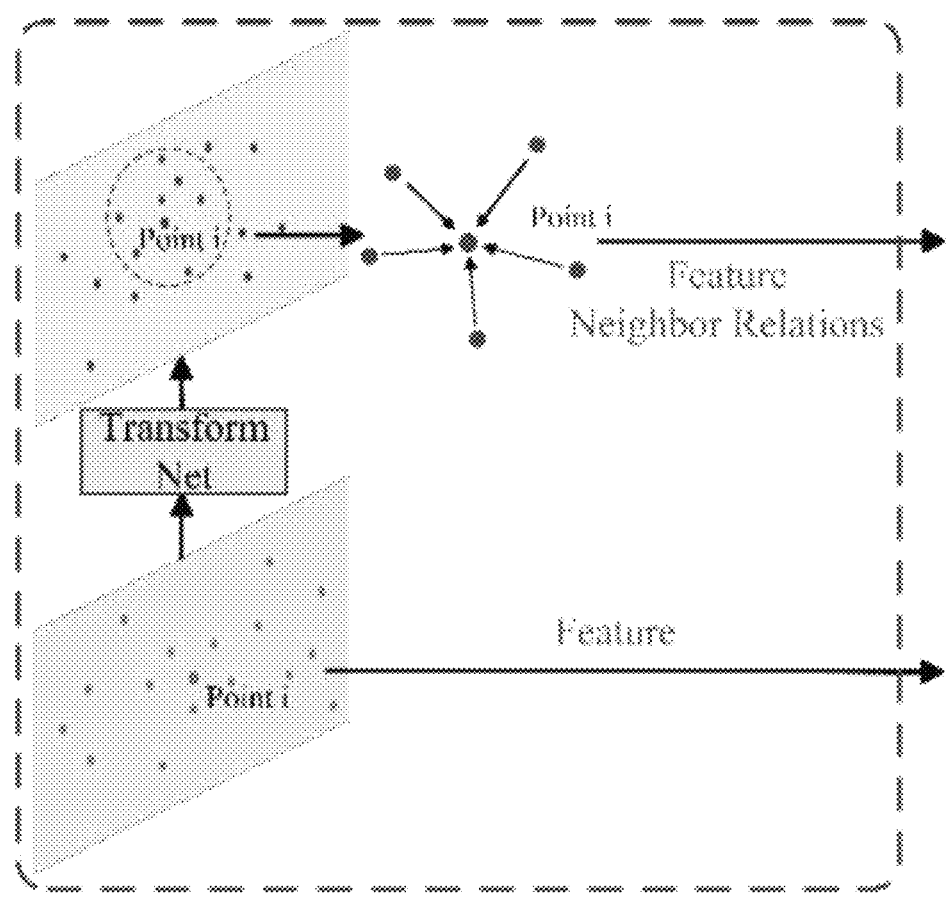

FIGS. 4a to 4c illustrate different network structures employed for local feature and relation extraction according to an embodiment of the present disclosure. In particular, FIG. 4a illustrates an original structure where the two outputs of the structure are the feature vector $f_F$ generated at step S202 and the neighborhood relation vector $f_R$ by performing kNN operations on each point of $f_F$. FIG. 4b illustrates a series structure where the two outputs of the structure are the feature vector $f_{FT}$ that generated at step S202 and Transform Net, and the neighborhood relation vector $f_{RT}$ by performing kNN operations on each point of $f_{FT}$. FIG. 4c illustrates a parallel structure where the two outputs of the structure are the feature vector $f_F$ generated at step S202, as well as the neighborhood relation vector $f_{RT}$ by the Transform Net and performing kNN operations on each point of $f_F$. It should be noted that in addition to extracting the neighborhood relation, the introduction of the Transform Net in the above designs can also make the feature vector and the neighborhood relation vector as invariant as possible. In an embodiment, a Transform Net ensures the rotational translation invariance by transforming the coordinates of each point into a unified viewpoint.

Returning to FIG. 2, neighborhood features of each point are aggregated at step S203. In particular, the previous output feature vector and the neighborhood relation vector obtained at step S202 are used as the input of the step S203.

In an embodiment, Graph Neural Network (GNN) may be introduced in S203 to fully mine the relationship between points. A large-scale point cloud mostly consists of 3D structures (such as planes, corners, shapes, etc.) of surrounding objects and their spatial distribution relationships, such as the relative orientation between two buildings with cube point cloud shapes, or the relative distance between two trees with point cloud clusters. Similar local point cloud structures in different locations usually have similar local features, which can be utilized as the main judgment for place recognition. For the presented disclosure, the entities and relations in a graph model may be employed to represent the composition of the scene, then their intrinsic relationships are represented, and a unique scene description vector is generated by GNN relational reasoning.

Figure 5:
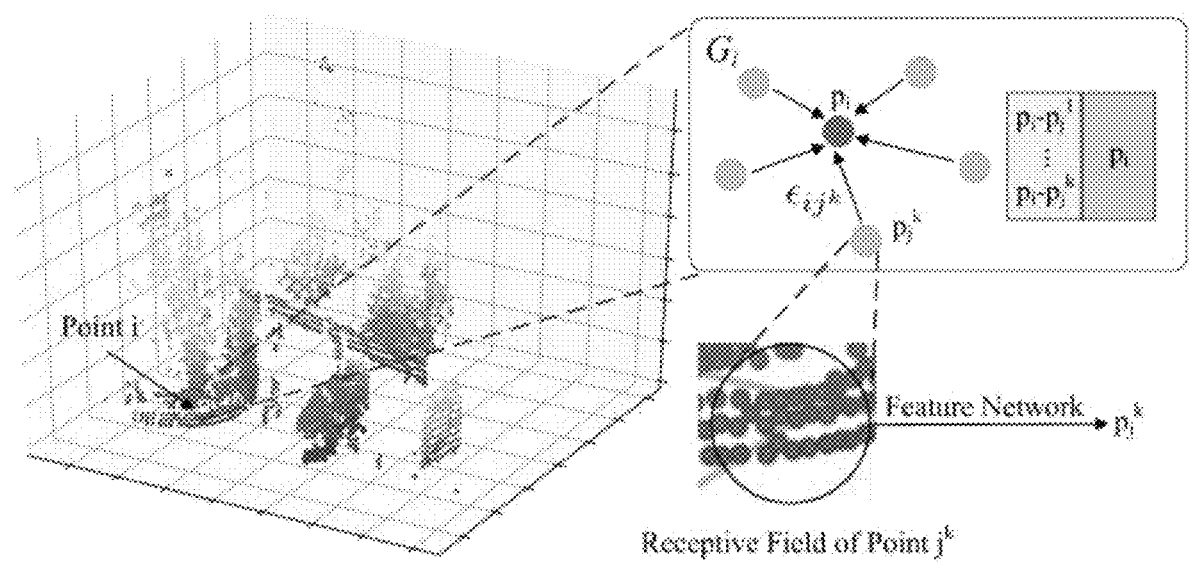
FIG. 5 illustrates an exemplary graph of showing the formulation of a graph neural network according to an embodiment of the present disclosure.

FIG. 5 illustrates an exemplary graph of showing the formulation of the graph neural network according to an embodiment of the present disclosure. Note that the receptive field of each point corresponds to a local neighborhood in the original point cloud, since the feature network has introduced the local point distribution characteristics and Local structure into the feature of each point. Then the GNN can be used to aggregate and extract the neighborhood description vector of the 3D point cloud.

Figure 6A:
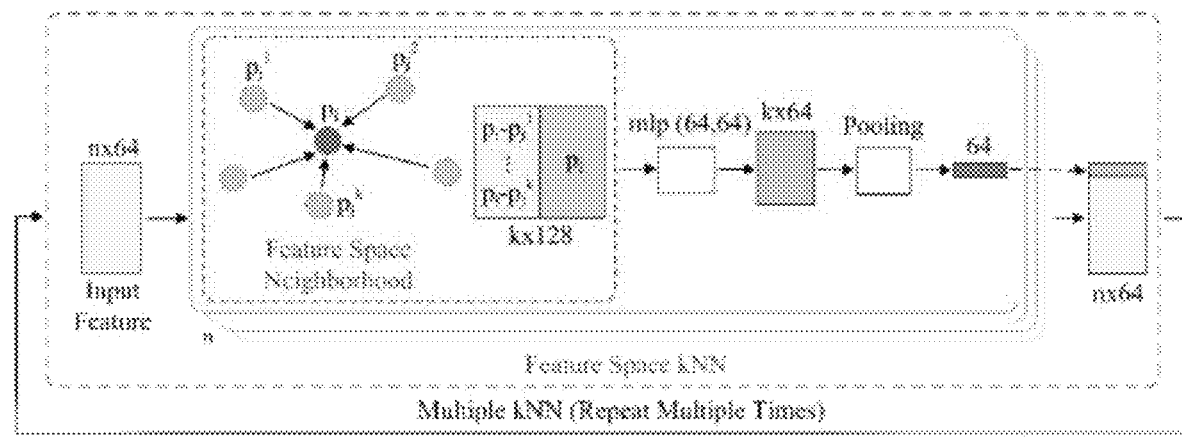
FIG. 6a and FIG. 6b illustrate the exemplary graph of showing the working principle of graph neural network-based neighborhood aggregation in Feature space and Cartesian space, respectively according to an embodiment of the present disclosure.
Figure 6B:
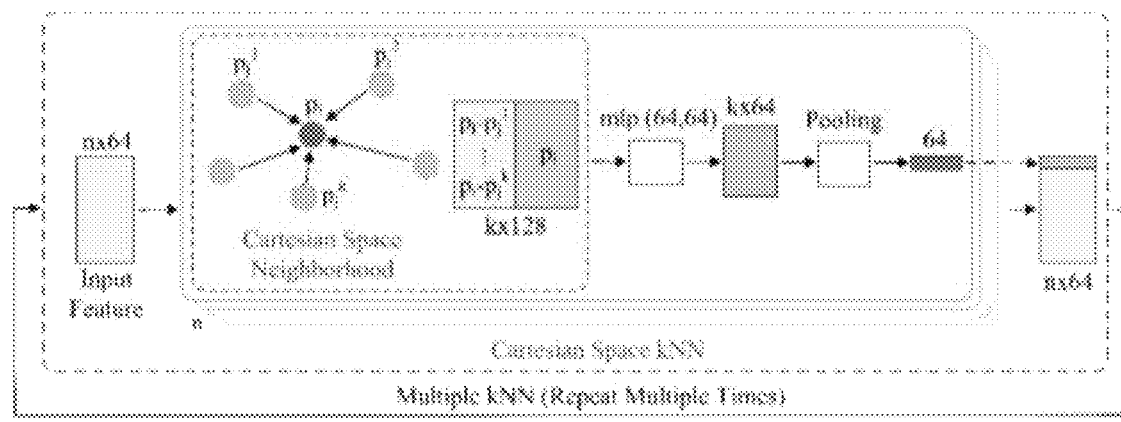

In the presented disclosure, GNN-based feature aggregation is performed in both the feature space and the Cartesian space, as shown in FIGS. 6a to 6b. FIG. 6a illustrates the exemplary graph of showing the working principle of graph neural network-based neighborhood aggregation in Feature space and FIG. 6b illustrates the exemplary graph of showing the working principle of graph neural network-based neighborhood aggregation in Cartesian space.

As shown in FIG. 6a, in the feature space, a dynamic graph $G_{i,d}$ is built for each point i through the multiple k-NN (k-nearest neighbors) iterations. More specifically, in each iteration, the output feature vector of the previous iteration is used as network input and a k-NN aggregation is conducted on each point by finding k neighbors with the nearest feature space distances. This is similar to CNN (Convolutional Neural Network) to achieve multi-scale feature learning. Each point feature $p_i$ is treated as a vertex in the graph. Each edge $\epsilon_{ij}^m$ represents the feature space relation between $p_i$ and its k nearest neighbors $p_j^m$ in the feature space, and $\epsilon_{ij}^m$ is defined as $\epsilon_{ij}^m = p_i - p_j^m$, $m = 1, 2, \ldots, k$. In an embodiment, the MLP operation may be used to update neighbor relations and the Maxpooling operation may be used to aggregate k edges information into a feature vector to update the point feature $p_i$. Note that the two points with large Cartesian space distance can also be aggregated for capturing similar semantic structures, due to the presented graph-based feature learning in feature space.

As shown in FIG. 6b, the contextual neighborhood information should be more concerned on Cartesian space, hence the k-NN graph neural network may also be implemented for this case. In another embodiment, the vertex and edge update strategies are the same as in the feature space and the only difference is that the graph model is constructed by Euclidean distance.

Figure 7A:
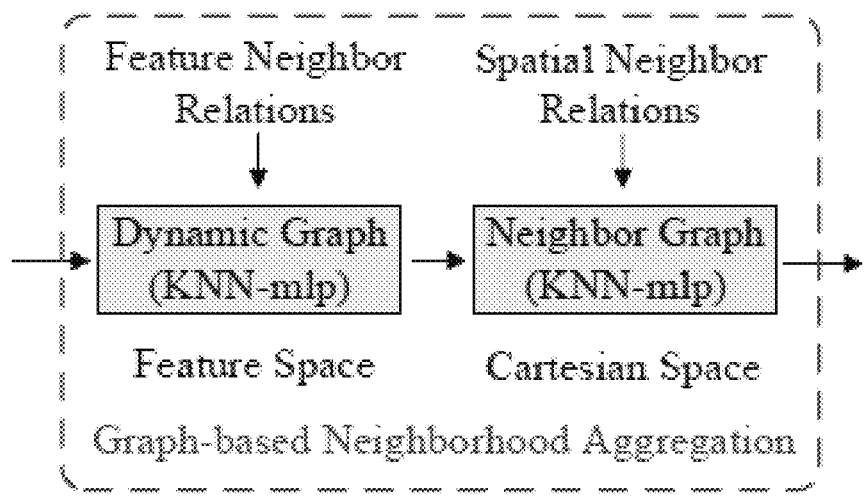
FIGS. 7a to 7c illustrate exemplary network structures employed for the fusion of the output from the Feature space aggregation and the Cartesian space aggregation, according to an embodiment of the present disclosure.
Figure 7B:
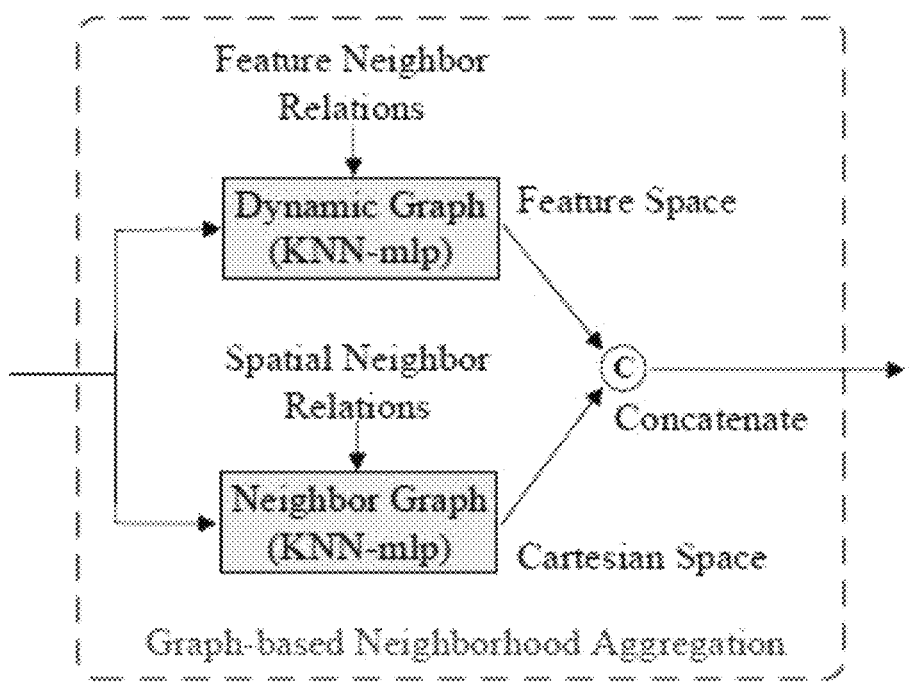
Figure 7C:
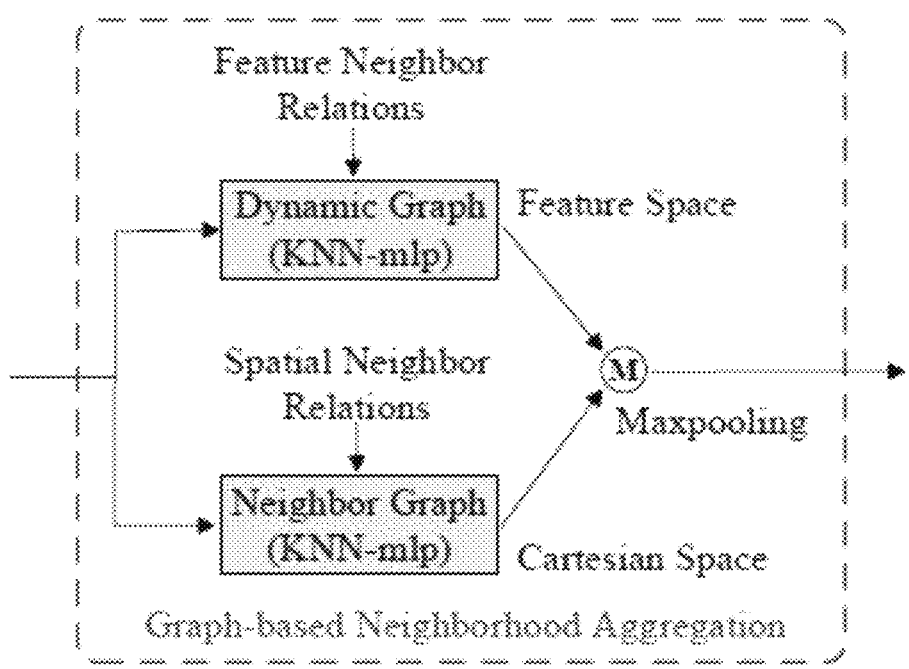

As described above, GNN modules in Feature space and Cartesian space aggregate neighborhood features and spatial distribution information separately. In order to better combine the output of the two modules, three structures may be designed to further aggregate these two modules, as shown in FIG. 7. FIG. 7 illustrates an example of different network structures employed for the fusion of the output from the Feature space aggregation and the Cartesian space aggregation, according to an embodiment of the present disclosure. As shown in FIG. 7a, the series and fully connected structure is presented, in which the output feature vector of one module is utilized as the input feature of the other module. Both the two different orders are considered. As shown in FIG. 7b, the parallel concatenation structure is presented, which cascades the output feature vectors of the two modules and merges the dual dimensional information through MLP to fuse the features. As shown in FIG. 7c, the parallel Maxpooling structure is presented, which directly integrates the output feature vectors of the two models through the max-pooling layer, taking the maximum values to generate the unified feature vector.

The global features are aggregated at step S204 based on the output of the aggregated neighborhood feature at step S203 to generate the final feature descriptor of the input point cloud. In one embodiment, a NetVLAD network may be used to aggregate local point cloud features into the VLAD bag-of-words global descriptor vector. By feeding the neighborhood feature descriptors of a point cloud into the NetVLAD network, the NetVLAD network learns multiple point cloud cluster centers and outputs a vector that aggregates the representation of the local feature vectors. This new machinery can be used to generate a global descriptor vector for an input point cloud.

Then feature extractors in the deep neural network may be trained at step S205. The deep neural network feature extractor defines a plurality of layers of operations, including a final regression layer that generates global descriptors. In general, the system trains the deep neural network to learn the mapping function that maps an input point cloud to a discriminative global descriptor vector. In an embodiment, the Lazy Quadruplet Loss function may be employed for predicting a ground truth global descriptor of a training point cloud since the positive sample distance is reduced during the training process, and the negative sample distance is enlarged to obtain a unique scene description vector. It has also been proven to be permutation invariant, thus suitable for the 3D point cloud.

Hereinafter a method for large-scale place recognition using the 3D point cloud will be described.

Figure 8:
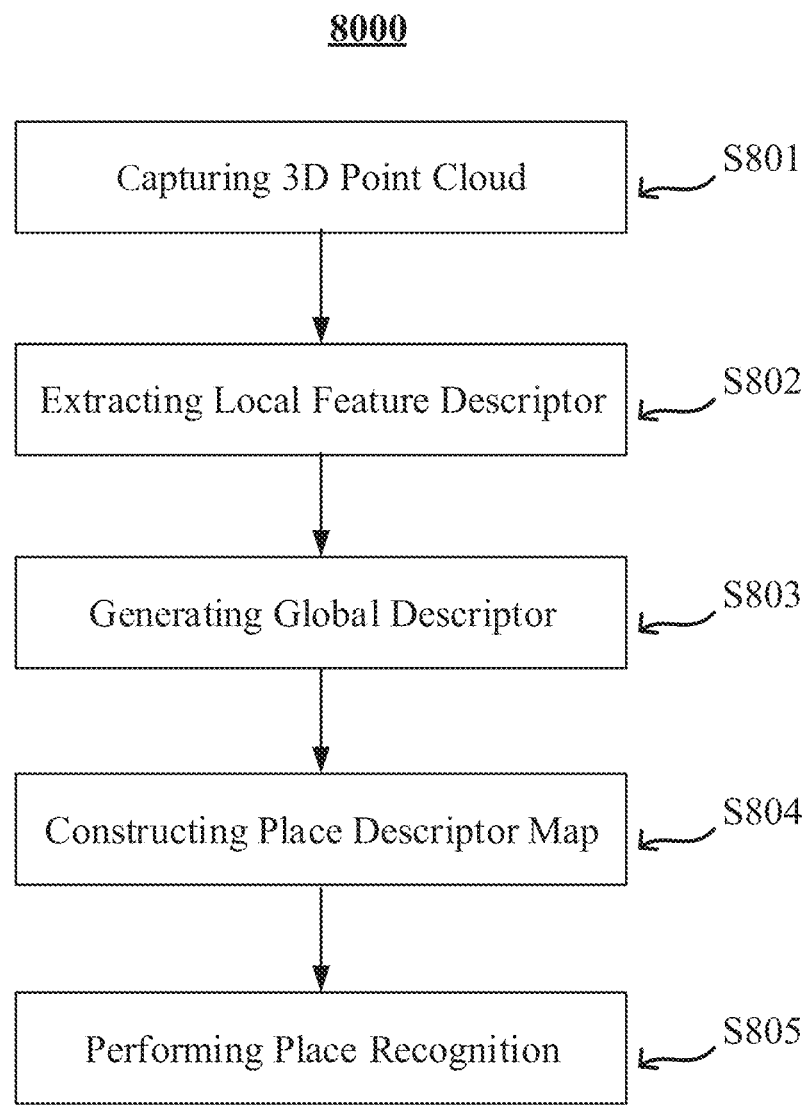
FIG. 8 is a view illustrating a method for place recognition according to an embodiment of the disclosure.

FIG. 8 is a view illustrating a method 8000 for place recognition according to an embodiment of the disclosure.

At step S801, a 3D point cloud of an area in which the mobile agent is traveling is captured. At step S802, local features of each point in the captured 3D point cloud may be extracted. At step S803, a global descriptor of each point of the 3D point cloud is generated by using a deep neural network, based on the extracted local features. Then, at step S804, a place descriptor map of the area is constructed based on the generated global descriptors. At step S805, the area may be recognized by using the generated place descriptor map.

Figure 9:
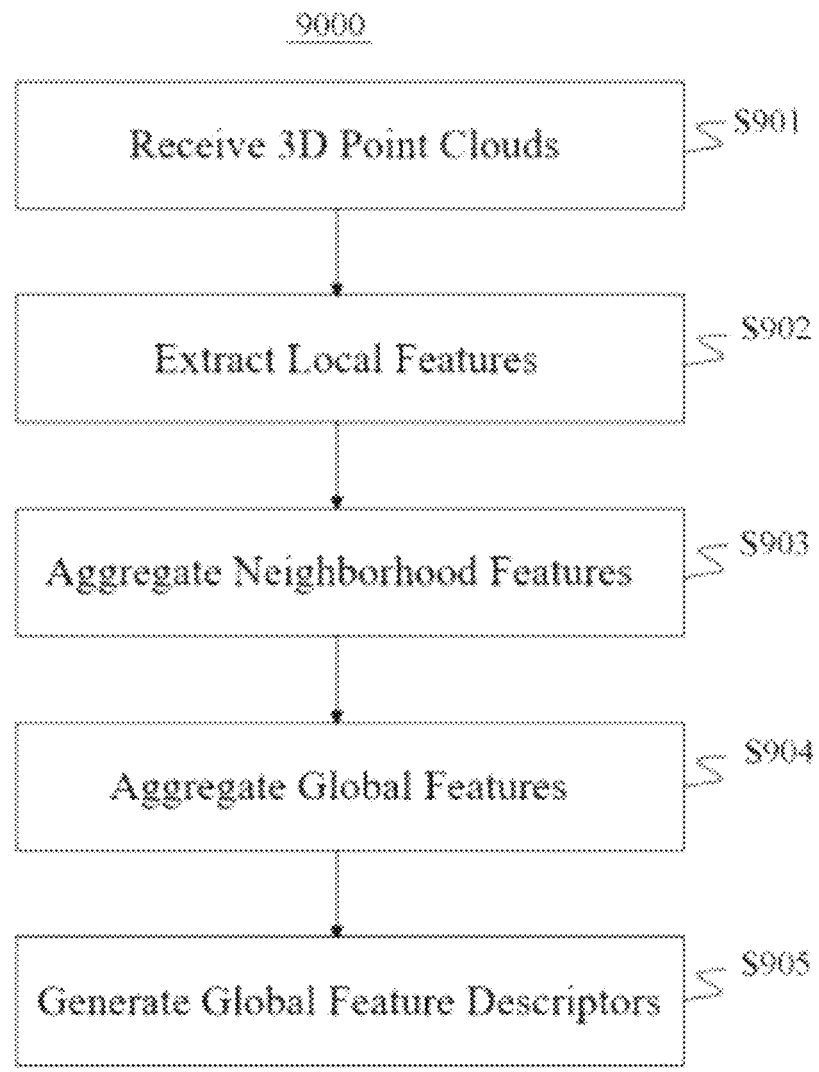
FIG. 9 is a flow chart of an example process for generating a global descriptor for an input 3D point cloud according to an embodiment of the present disclosure.

FIG. 9 is a flow chart of an example process for generating a global descriptor for an input 3D point cloud according to an embodiment of the present disclosure. The process will be described as being performed by an appropriately programmed system of one or more computers.

At step S901, a point cloud for the feature extraction in a wide variety of contexts may be received. At step S902, local features of each point of the received 3D point cloud may be extracted. At step S903, neighborhood feature descriptors of a plurality of nearest neighboring points around each point may be extracted. In order to further enhance the previous calculated local features, neighborhood relationship reasoning needs to be performed for each point because the similarity in the feature space may correspond to a large difference in Cartesian space. In an embodiment, the GNN can be used to mine the relationship between points. The entities and relations in a graph model may be employed to represent the composition of the scene, then their intrinsic relationships are represented, and a unique neighborhood feature descriptor vector is generated by GNN relational reasoning.

At step S904, the global features of each point of the point cloud may be aggregated. The system can aggregate the neighborhood feature descriptors previously output at step S903. In one embodiment, a NetVLAD network that customized for the point cloud can be used for this local feature aggregation task and generate a global descriptor for the input point cloud.

Then, at step S905, the global feature descriptor may be generated. The output from step S904 is usually a high dimensional vector for the input point cloud, that makes it computationally expensive for place recognition tasks. To alleviate this problem, a fully connected layer is used to compress the output of the global feature aggregator into a compact output feature vector, which is then L2-normalized to produce the final global descriptor vector for the input point cloud that can be used for efficient retrieval.

Figure 10:
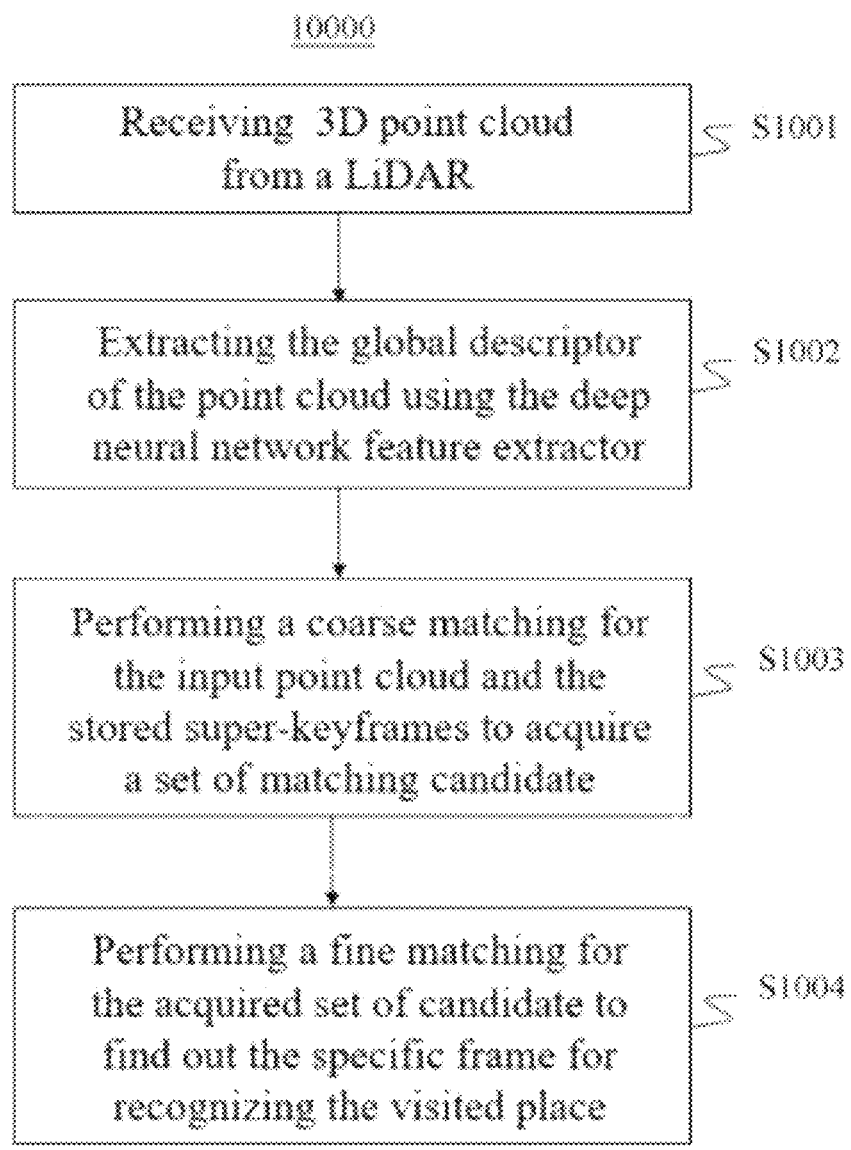
FIG. 10 illustrates a schematic view of a method for the place recognition using the 3D point cloud according to an embodiment of the present disclosure.

FIG. 10 illustrates the method 10000 for place recognition using the online measured 3D point cloud from a LiDAR sensor of a self-driving vehicle. At step S1001, a sequence of 3D point clouds is received by the onboard 3D scanners. At step S1002, the global descriptors of the input point clouds are extracted frame by frame using the deep neural network feature extractor. At step S1003, a coarse matching is performed for the input point cloud and the pre-stored super-keyframes to find out the matched cluster. At step S1004, a fine matching is performed in the found cluster to find out the accurate location of the input point cloud for achieving the place recognition task.

For receiving 3D point cloud data, a LiDAR sensor may be configured to place on the vehicle and capture the point cloud by measuring a large number of points on the surface of surrounding objects and may output the point cloud as a data file. As a result of a 3D scanning process of the object by the LiDAR sensor, the point cloud can be used to identify or visualize the surrounding environments of the vehicle.

In an embodiment, the deep neural network is trained and evaluated on the Oxford Robotcar Dataset. The Oxford RoboCar Dataset is obtained by vertical scanning of the SICK LMS-151 2D LiDAR mounted on the car. The 3D point cloud submap is made up of point clouds within the car's 20 m trajectory. In particular, the label information of the Oxford RoboCar dataset may be obtained by removing inconsistent data from the scene and defining structurally similar point clouds to be at most 10 m apart and those structurally dissimilar to be at least 50 m apart. The point cloud in Oxford RoboCar dataset is randomly downsampled to 4096 points, and normalize it to the range of $[-1, 1]$. The trained deep neural network is then used as a feature extractor for point cloud data. The final global feature descriptor is generated in the form of a 256-dimensional vector and can be employed to uniquely describe the input large-scale point cloud.

With the extracted global feature descriptor of the point cloud, place recognition can then be performed. The environment in which the vehicle has traveled is first analyzed by investigating the feature space distribution characteristics of the global descriptors and select out the super keyframes. Then place recognition can be achieved in a coarse-to-fine matching strategy so that to ensure the accuracy and real-time performance simultaneously.

In an embodiment, the feature space distribution of the global descriptors is firstly investigated, and descriptor clusters are generated. Canopy based approach and K-means based approach (or their combination) are two classes of promising approaches for high dimensional space clustering tasks and it can be found that, for the large-scale case, K-means based method is much better since the clustering performance of Canopy depends largely on the initial cluster centers, so K-means based clustering method is chosen for this task. More specifically, one can evaluate the sum of distortions under different cluster number k and utilize the Elbow method to determine the optimal k value. What's more, one can introduce an additional constraint which requires that the L2 distance from each global descriptor to its corresponding cluster center is lower than D, where D is an environment related parameter which defines the L2 distance threshold of two global descriptors which can be recognized as the similar places. Then, in each cluster, the global descriptor with the nearest L2 distance to the cluster center is selected as the super keyframe and other global descriptors are restored in a descriptor index which corresponds to this super keyframe. Then one can obtain k super keyframes and k global descriptor indices. The selected super keyframes contain all the typical places in the whole environment and each type of typical places has at least one super keyframe. As above, the selection of super keyframes is dynamically updated as new point clouds are input and global descriptors are extracted.

In an embodiment, to perform the coarse matching, the global descriptor of the new input point cloud is compared with all the super keyframes firstly to find out the matched cluster by calculating the L2 distances. Then in the fine matching stage, local sequence matching strategy is utilized around each place in the corresponding global descriptor index of the matched cluster to find out the accurate location of the input point cloud, thus achieving the place recognition task. The basic idea of fine matching is that, instead of finding the global best match frame relative to the current frame, one looks for the best candidate matching frame within every local sequence. To do this, the fine matching process is divided into two components: local best recognition and sequence matching. Local best recognition towards to find all the frames within local neighborhoods that are the best match for the current frame, which is conducted by calculating the difference between two frames based on the L2 distances of the global descriptors that extracted by the former deep neural network, and a difference matrix would be generated as shown in FIG. 10. Then, to match the target place sequences, a search is performed through the current difference matrix with a searching window. At each reference frame, the search projects several trajectories based on different possible velocities. The trajectory velocity is ranged from $V_{min}$ to $V_{max}$. The L2 distance-based difference score is calculated in each trajectory line. The trajectory with the minimum score is the best match.

Figure 11A:
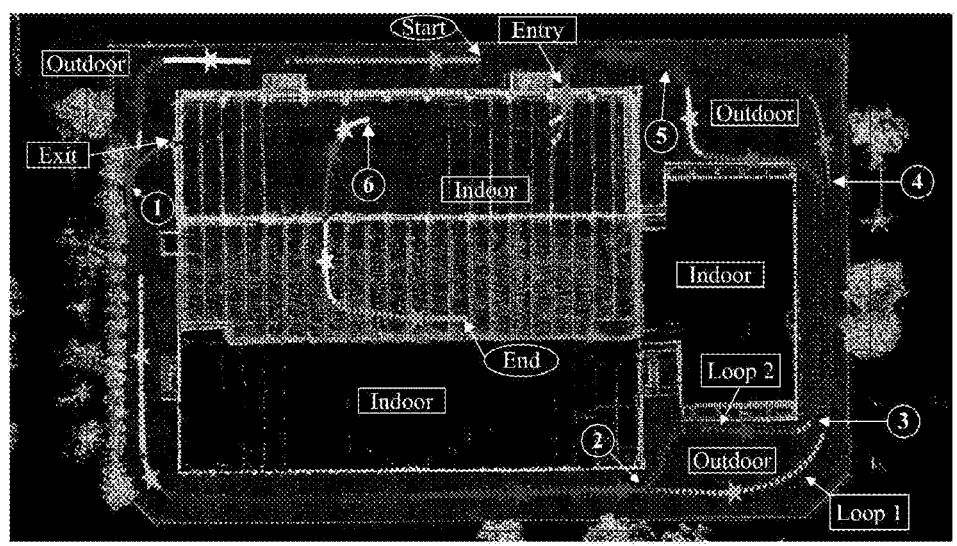
FIGS. 11a and 11b illustrate, respectively, an exemplary place recognition results using the coarse-to-fine sequence matching strategy according to an embodiment of the present disclosure.
Figure 11B:
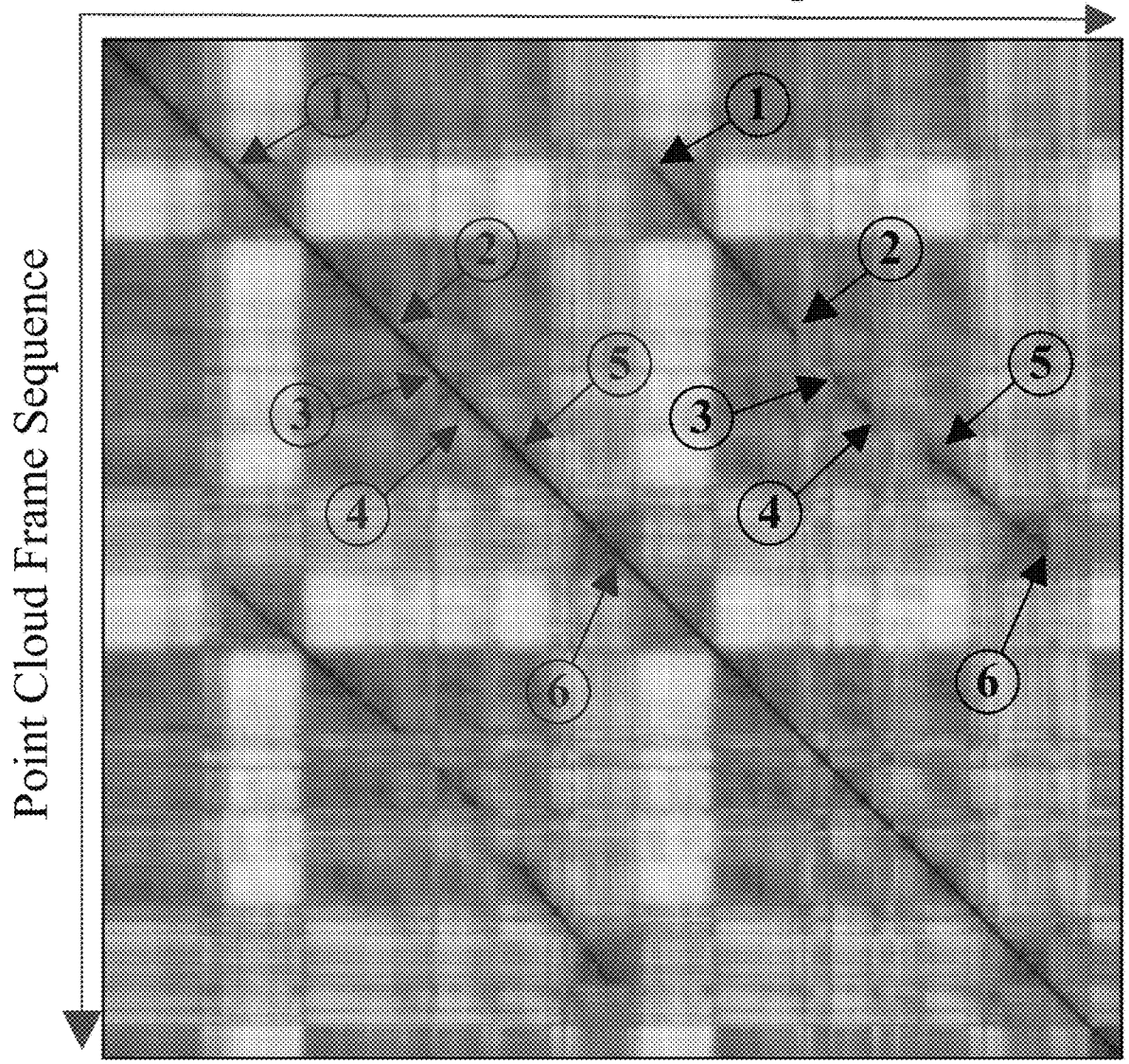

FIGS. 11a and 11b illustrate, respectively, an exemplary place recognition results using the coarse-to-fine sequence matching strategy according to an embodiment of the present disclosure. The experiment is conducted in an industry park (about 120 m×80 m) which contains both indoor and outdoor industrial environments. The vehicle is commanded to track the outdoor-indoor route for two loops, and in the second loop, some parts of the route are designed to have some deviations from those in the first loop. The desired vehicle velocity is set to $V_d$=3 m/s in both loops. The trajectory velocity bounds in sequence searching are set to $V_{min}$=0.8$V_d$ and $V_{max}$=1.2$V_d$, and the sequence searching window size is set to 10 point cloud frames. Using the presented method and system, the computation time in global descriptor generation and place recognition is about 150 ms. As shown in FIGS. 11a and 11b, all the detected loop-closure locations assemble three matching route segments, i.e., the segment from location 1 to location 2, the segment from location 3 to location 4 and the segment from location 5 to location 6. FIG. 11a illustrates the laser point cloud map and the vehicle route, the star-points represent the selected super keyframes, the colored points represent all the point cloud frames and their colors represent their belonged clusters. FIG. 11b shows the L2 distances between the generated global descriptors along the whole point cloud frame sequence, where the color scale of the point is darker the L2 distance is smaller, the red markers belong to the first loop and the black markers belong to the second loop. From FIG. 11a, one can find that the route segment from location 2 to location 3 in the second loop is different from that in the first loop, and in FIG. 11b, the proposed point cloud learning and place recognition approaches also divide these into different place sequences successfully. The similar results can also be found in the segment from location 4 to location 5. Furthermore, from location 3 to location 4, the vehicle trajectory in the second loop has a slightly offset compared with that in the first loop, however, the proposed approach can recognize these two segments as the same place sequences successfully, this validates the robustness of the proposed approaches to viewpoint variations.

Figure 12:
FIG. 12 illustrates four exemplary point cloud frames and video image frames pair that achieves place recognition successfully, according to an embodiment of the present disclosure.

FIG. 12 illustrates four exemplary point cloud frames and video image frames pair that achieve place recognition successfully, according to an embodiment of the present disclosure. The corresponding point cloud frames and video image frames from a matched sequence are given by running the presented method in a university campus dataset. For each pair, the video image frame and the corresponding point cloud frame recorded in the first experiment loop are shown in the upper, while the frames recorded in the second loop are shown in the lower. All the point clouds have been projected into the horizontal plane for better visualization. It can be observed that all the examples show the same place, but the visual similarity is very low. For such cases, the traditional image-based method is difficult to achieve place recognition, but the proposed point cloud learning-based approach has achieved excellent results.

Hereinafter, comparative experiments are illustrated to validate the superior performance of the system and method proposed in the present disclosure.

Table 1 illustrates comparative experimental results of 3D point cloud-based place recognition using the method of the present disclosure and the current state-of-the-art methods. The testing data is collected in different seasons, different times and different weathers, and one querying the same scene in these sets for place recognition. Such place recognition with a large time span and light changes is very difficult with images. Both the Average Recall@N and the Average Recall@1% are used to evaluate the ability of place recognition to see if there is a right scene in the top N or top 1% scenes closest to it.

The presented method is compared to the original PointNet architecture with the Maxpooling layer (PN MAX), and PointNet trained in ModelNet (PN STD) to study whether the model trained on the small-scale dataset can be scaled to large-scale environments. Moreover, the presented method is also compared to the state-of-the-art PN-VLAD baseline, and PN-VLAD refine. One train the PN STD, PN MAX, PN-VLAD baseline, and PN-VLAD refine using only the Oxford RoboCar training dataset. The network configurations of PN STD, PN MAX, PN-VLAD baseline and refine are set to be the same. As shown in Table 1, FN represents the feature network with the proposed ten local features. FN-SF-VLAD, FN-PC-VLAD, and FN-PM-VLAD are the network with three different feature aggregation structures: the Series and Fully connected structure, the Parallel Concatenation structure, and the Parallel Maxpooling structure, as stated in FIG. 7. FN-VLAD is the network without graph-based neighborhood aggregation. DG and NG represent the Dynamic Graph and fixed Neighbor Graph in the proposed graph-based neighborhood aggregation.

TABLE 1

Comparison results of the average recall (%) at top 1% (@1%) and at top 1 (@1) under different networks.

|  | Ave recall @1% | Axe recall @1 |
| --- | --- | --- |
| PN STD | 46.52 | 31.87 |
| PN MAX | 73.87 | 54.16 |
| PN-VLAD baseline | 81.01 | 62.76 |
| PN-VLAD refine | 80.71 | 63.33 |
| FN-VLAD (our) | 89.77 | 75.79 |
| FN-NG-VLAD (our) | 90.38 | 77.74 |
| FN-DG-VLAD (our) | 91.44 | 80.14 |
| FN-PM-VLAD (our) | 91.20 | 78.77 |
| FN-PC-VLAD (our) | 92.27 | 81.41 |
| EN-SF-VLAD (our) | 94.92 | 86.28 |

Due to the application of local feature extraction and GNN modules, the presented network has superior advantages for place recognition in large-scale environments, far exceeding PointNetVLAD from 81.01% to 94.92% (using Average Recall@1% as the metric). Among the three aggregation methods, FN-SF-VLAD is the most accurate one. In SF, the GNN learns the neighborhood structure features of the same semantic information in feature space, and then further aggregates in Cartesian space. SF can learn the spatial distribution characteristics of neighborhood features, which can be introduced into the following network and learned as a spatial coordinate relationship. In addition, FN-PC-VLAD is better than FN-PM-VLAD with faster convergence speed and higher recall accuracy, since it can save more information for subsequent aggregation.

Moreover, Table 2 gives the ablation study results of different network structures for local feature and relation extraction, where FN-Original-VLAD denotes the original structure (FIG. 4a), FN-Series-VLAD denotes the series structure (FIG. 4b), FN-Parallel-VLAD denotes a parallel structure (FIG. 4c), and xyz represents only the position coordinates of each point are used. Table 2 shows that the parallel structure is better than the original structure and the series structure, which implies that only utilizing the feature relations in the transformed feature space and remaining the original feature vectors can achieve the best network accuracy. Please note that in PointNet and PointNetVLAD, they only use the series structure.

TABLE 2

Ablation studies of different feature neighbor relations.

|  | Ave recall @1% | Ave recall @1 |
| --- | --- | --- |
| xyz-Series-VLAD | 83.22 | 66.01 |
| xyz-Parallel-VLAD | 84.74 | 69.75 |
| FN-Original-VLAD | 91.53 | 80.29 |
| FN-Series-VLAD | 92.60 | 81.09 |
| FN-Parallel-VLAD | 94.92 | 86.28 |

Figure 13:
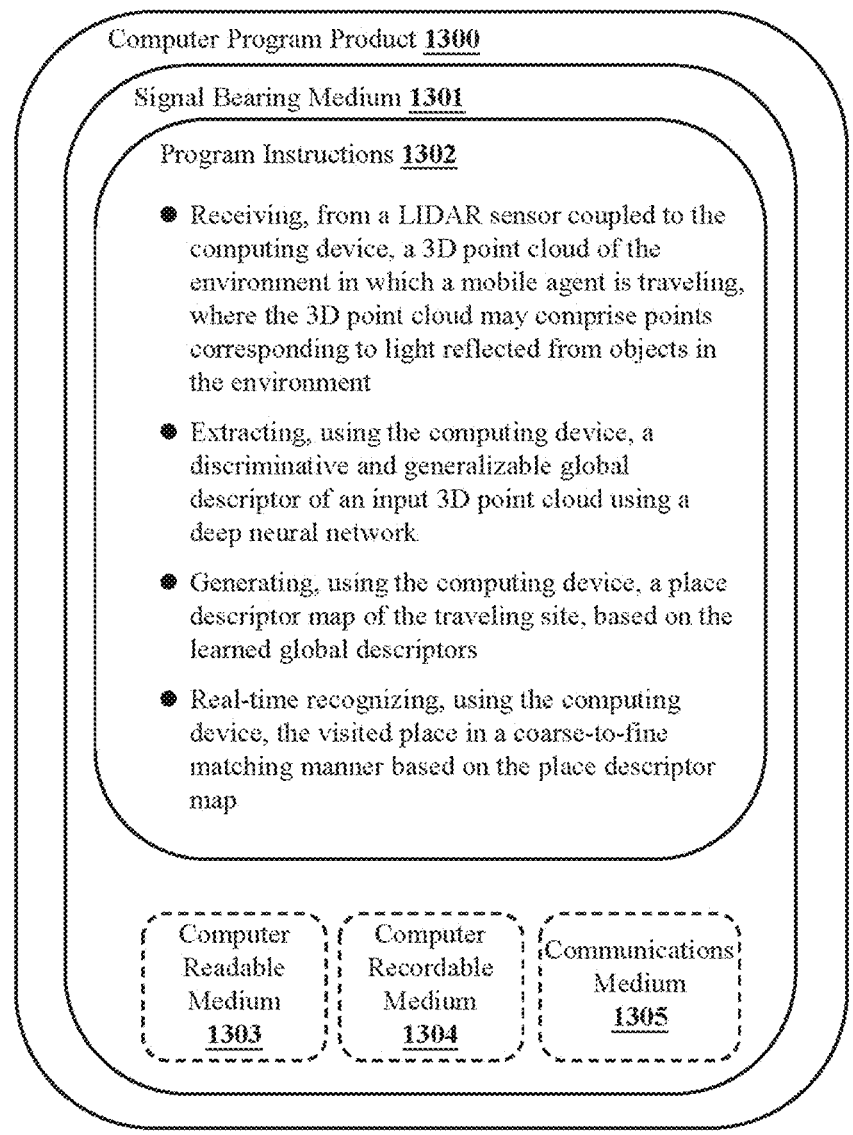
FIG. 13 illustrates a schematic structural diagram of a computer system adapted to implement the embodiments of the present disclosure.

With reference to FIG. 13, a schematic diagram of a computer system 1300 adapted to implement the embodiments of the present disclosure is illustrated. The computer system shown in FIG. 13 is merely an example and should not impose any restriction on the functions and the scope of use of the embodiments of the present disclosure. The computer system 1300 may be used, for example, to implement a portion of one or more components used for a point cloud learning device, a map generating device or a place recognition device. The computer system is known to those skilled in the art and thus is described briefly herein.

As shown in FIG. 13, the computer system 1300 includes a computer program product for executing a computer process on a computing device. In one embodiment, the example computer program product is provided using a signal bearing medium 1301. The signal bearing medium 1301 may include one or more program instructions 1302 that, when executed by one or more processors may provide functionality or portions of the functionality described above with respect to FIGS. 1-10. The program instructions 1302 in FIG. 13 describe example instructions.

In some examples, the signal bearing medium 1301 may encompass a computer-readable medium 1303, such as, but not limited to, a hard disk drive, a portable computer disk, a Compact Disc (CD), a Digital Video Disk (DVD), a digital tape, memory, etc. In Some implementations, the signal bearing medium 1301 may encompass a computer recordable medium 1304, such as, but not limited to, an optical memory, a magnet memory, CDs or DVDs, etc. In some implementations, the signal bearing medium 1301 may encompass a communication medium 1305, such as, but not limited to, a fiber optic cable, a wired communications link, a wireless communication link, etc. Thus, for example, the signal bearing medium 1301 may be conveyed by a wireless form of the communications medium 1305, such as, but not limited to, a wireless communications medium conforming to a specific transmission protocol.

The one or more programming instructions 1302 may be, for example, computer executable and/or logic implemented instructions. In some examples, a computing device may be configured to provide various operations, functions, or actions in response to the programming instructions 1302 conveyed to the computing device by one or more of the computer readable medium 1303, the computer recordable medium 1304, and/or the communications medium 1305. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It should be noted that the computer readable medium in the present disclosure may be computer readable storage medium. An example of the computer readable storage medium may include, but not limited to semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flowcharts and block diagrams in the accompanying drawings illustrate system architectures, functions and operations that may be implemented according to the system, the method and the computer program product of the various embodiments of the present disclosure. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may also occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flowcharts and a combination of the blocks in the block diagrams and/or the flowcharts may be implemented by a dedicated hardware-based system executing specific functions or operations, or by a combination of a dedicated hardware and computer instructions.

The devices involved in the embodiments of the present disclosure may be implemented by way of software or hardware. The described devices may also be provided in a processor, for example, described as a pattern generating device, a map extracting device or a reconstructing device. Here, the names of these devices are not considered as limitations to the devices in certain circumstances.

In another aspect, the present disclosure further provides a computer readable medium. The computer readable medium may be included in the computer system described in the above embodiments, or a stand-alone computer readable medium which has not been assembled into the computer system. The computer readable medium carries one or more programs.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

The above are merely optional embodiments of the present disclosure. A person skilled in the art may make modifications and improvements to those embodiments without departing from the principle of the present disclosure, and these modifications and improvements shall also fall within the scope of the present disclosure.

What is claimed is:

1. A computer-implemented method for place recognition based on a 3D point cloud, comprising: capturing a 3D point cloud of an area in which the mobile agent is traveling; extracting local features of each point in the captured 3D point cloud,
    wherein the extracting comprises obtaining spatial relationships between each point and nearest neighboring points around the point in the 3D point cloud by obtaining spatial relationships between the point and nearest neighboring points around the point in the 3D point cloud in a feature space; obtaining spatial relationships between the point and the nearest neighboring points around the point in the 3D point cloud in a Cartesian space; and fusing the spatial relationships in the feature space and the spatial relationships in the Cartesian space;
    generating a global descriptor of each point of the 3D point cloud using a deep neural network, based on the extracted local features and the spatial relationships between the point and the nearest neighboring points around the point;
    constructing a place descriptor map of the area based on the generated global descriptors; and recognizing the area by using the generated place descriptor map.

2. The computer-implemented method of claim 1, the generating further comprising:
    extracting neighborhood feature descriptors of a plurality of nearest neighboring points around each point; and
    aggregating the neighborhood feature descriptors to generate the global descriptor.

3. The computer-implemented method of claim 2, the extracting further comprising adaptively selecting the neighborhood size for each point.

4. The computer-implemented method of claim 2, further comprising training the deep neural network by 3D Cartesian coordinates of each point, the local features of each point, and the neighborhood feature descriptors of a plurality of nearest neighboring points around the point.

5. The computer-implemented method of claim 4, further comprising constructing the place descriptor map of the area by using the global descriptors and the corresponding position information.

6. The computer-implemented method of claim 5, further comprising:
    generating descriptor clusters from feature space distribution information by clustering the global descriptors; and
    selecting a super keyframe from each descriptor cluster based on a distance between the global descriptor to a center of the descriptor cluster, and storing other global descriptors in the cluster in a descriptor index which corresponds to the selected super keyframe.

7. The computer-implemented method of claim 1, the recognizing further comprising:
a coarse matching stage including matching the global descriptor of a new 3D point cloud with descriptors of all super keyframes to find out a matched cluster; and
a fine matching stage including performing local sequence matching around each place using the corresponding global descriptor index in the matched cluster to find out the accurate location of the input 3D point cloud.

8. The computer-implemented method of claim 7, wherein the place descriptor map and super keyframes are dynamically updated as the mobile agent is running.

9. The computer-implemented method of claim 1, wherein the 3D point cloud is captured by a 3D scanner or a LiDAR (light detection and ranging) sensor.

10. A system for place recognition based on a 3D point cloud, comprising: a processor; and a memory coupled to the processor to store instructions, which when executed by the processor, cause the processor to perform operations including:
capturing a 3D point cloud of an area in which the mobile agent is traveling; extracting local features of each point in the captured 3D point cloud,
wherein the extracting comprises obtaining spatial relationships between each point and nearest neighboring points around the point in the 3D point cloud by obtaining spatial relationships between the point and nearest neighboring points around the point in the 3D point cloud in a feature space; obtaining spatial relationships between the point and the nearest neighboring points around the point in the 3D point cloud in a Cartesian space; and fusing the spatial relationships in the feature space and the spatial relationships in the Cartesian space;
generating a global descriptor of each point of the 3D point cloud using a deep neural network, based on the extracted local features and the spatial relationships between the point and the nearest neighboring points around the point; constructing a place descriptor map of the area based on the generated global descriptors; and recognizing the area by using the generated place descriptor map.

11. The system of claim 10, wherein the processor is further configured to:
extract neighborhood feature descriptors of a plurality of nearest neighboring points around each point; and
aggregate the neighborhood feature descriptors to generate the global descriptor.

12. The system of claim 11, the extracting further comprising adaptively selecting the neighborhood size for each point.

13. The system of claim 11, wherein the processor is further configured to train the deep neural network by 3D Cartesian coordinates of each point, the local features of each point, and the neighborhood feature descriptors of a plurality of nearest neighboring points around the point.

14. The system of claim 13, wherein the processor is further configured to construct the place descriptor map of the area by using the global descriptors and the corresponding position information.

15. The system of claim 14, wherein the processor is further configured to:
generate descriptor clusters from feature space distribution information by clustering the global descriptors;
select a super keyframe from each descriptor cluster based on a distance between the global descriptor to a center of the descriptor cluster, and
store other global descriptors in the cluster in a descriptor index which corresponds to the selected super keyframe.

16. The system of claim 10, the recognizing further comprising:
a coarse matching stage including matching the global descriptor of a new 3D point cloud with descriptors of all super keyframes to find out a matched cluster; and
a fine matching stage including performing local sequence matching around each place using the corresponding global descriptor index in the matched cluster to find out the accurate location of the input 3D point cloud.

17. The system according to claim 16, wherein the place descriptor map and super keyframes are dynamically updated as the mobile agent is running.

18. The system according to claim 10, wherein the 3D point cloud is captured by a 3D scanner or a LiDAR (light detection and ranging) sensor.

19. A non-transitory machine-readable medium having instructions stored therein, which when executed by a processor, cause the processor to perform operations comprising: capturing a 3D point cloud of an area in which the mobile agent is traveling; extracting local features of each point in the captured 3D point cloud, wherein the extracting comprises obtaining spatial relationships between each point and nearest neighboring points around the point in the 3D point cloud by obtaining spatial relationships between the point and nearest neighboring points around the point in the 3D point cloud in a feature space; obtaining spatial relationships between the point and the nearest neighboring points around the point in the 3D point cloud in a Cartesian space; and fusing the spatial relationships in the feature space and the spatial relationships in the Cartesian space;
generating a global descriptor of each point of the 3D point cloud using a deep neural network, based on the extracted local features and the spatial relationships between the point and the nearest neighboring points around the point; constructing a place descriptor map of the area based on the generated global descriptors; and recognizing the area by using the generated place descriptor map.

* * * * *